United States Patent
Fernández Gutiérrez

(10) Patent No.: US 8,645,278 B2
(45) Date of Patent: *Feb. 4, 2014

(54) PROCESS FOR THE ON-LINE SALE OF A SOFTWARE PRODUCT

(75) Inventor: Alvaro Fernández Gutiérrez, Barcelona (ES)

(73) Assignee: Media Patents, S.L., Barcelona (ES)

( * ) Notice: Subject to any disclaimer, the term of this patent is extended or adjusted under 35 U.S.C. 154(b) by 190 days.

This patent is subject to a terminal disclaimer.

(21) Appl. No.: 12/785,358

(22) Filed: May 21, 2010

(65) Prior Publication Data

US 2010/0228647 A1    Sep. 9, 2010

Related U.S. Application Data

(63) Continuation of application No. 11/797,633, filed on May 4, 2007.

(30) Foreign Application Priority Data

Nov. 10, 2006  (ES) .................................. 200602849

(51) Int. Cl.
G06F 21/00    (2013.01)

(52) U.S. Cl.
USPC ................... 705/59; 705/50; 705/51; 705/52; 717/174; 717/176; 717/177

(58) Field of Classification Search
USPC ............................... 705/51, 59; 717/174–178
See application file for complete search history.

(56) References Cited

U.S. PATENT DOCUMENTS

| 4,658,093 A | 4/1987 | Hellman |
| 4,866,769 A | 9/1989 | Karp |
| 4,916,747 A | 4/1990 | Arimoto |
| 4,953,209 A | 8/1990 | Ryder et al. |
| 5,247,575 A | 9/1993 | Sprague et al. |
| 5,297,071 A | 3/1994 | Sugino |

(Continued)

FOREIGN PATENT DOCUMENTS

| EP | 1243998 A1 | 9/2002 |
| EP | 1641263 A2 | 3/2006 |

(Continued)

OTHER PUBLICATIONS

Williams, L.M.; "E-warehouse is secure ESD (electronic software distribution);" Tape-Disc Business [Online]; Aug. 1997; vol. 11, No. 8; p. 31(5).

(Continued)

*Primary Examiner* — Mamon Obeid

(74) *Attorney, Agent, or Firm* — Wiggin and Dana LLP; Gregory S. Rosenblatt

(57) ABSTRACT

Online sale of software product use licenses through a data network by offering software products (SOFT) through vendor sites, purchasing a license on-line on one of said vendor sites, and activating said license on-line by a different licensing site. A specific component (COMP) is provided with the software product (SOFT) and identifying data (IDV) of the vendor site are transmitted during the download of the software product (SOFT). When the component (COMP) is executed in an equipment, the component (COMP) locally accesses said data (IDV) and identifying data (IDL) of the licensing site and activates the license by setting up an on-line communication with the licensing site.

11 Claims, 4 Drawing Sheets

(56) References Cited

U.S. PATENT DOCUMENTS

| | | | | |
|---|---|---|---|---|
| 5,375,240 A | * | 12/1994 | Grundy | 726/28 |
| 5,563,946 A | | 10/1996 | Cooper | |
| 5,628,015 A | | 5/1997 | Singh | |
| 5,629,980 A | | 5/1997 | Stefik | |
| 5,671,412 A | * | 9/1997 | Christiano | 1/1 |
| 5,708,709 A | * | 1/1998 | Rose | 705/59 |
| 5,790,664 A | * | 8/1998 | Coley et al. | 709/203 |
| 5,815,665 A | | 9/1998 | Teper et al. | |
| 5,855,008 A | | 12/1998 | Goldhaber | |
| 5,864,620 A | | 1/1999 | Pettitt | |
| 5,870,559 A | | 2/1999 | Leshem et al. | |
| 5,883,955 A | * | 3/1999 | Ronning | 705/52 |
| 5,953,533 A | * | 9/1999 | Fink et al. | 717/175 |
| 6,009,525 A | | 12/1999 | Horstmann | |
| 6,044,469 A | * | 3/2000 | Horstmann | 726/29 |
| 6,073,124 A | * | 6/2000 | Krishnan et al. | 705/59 |
| 6,078,909 A | | 6/2000 | Knutson | |
| 6,189,146 B1 | | 2/2001 | Misra et al. | |
| 6,226,618 B1 | | 5/2001 | Downs et al. | |
| 6,237,006 B1 | * | 5/2001 | Weinberg et al. | 707/797 |
| 6,243,692 B1 | * | 6/2001 | Floyd et al. | 705/59 |
| 6,247,130 B1 | | 6/2001 | Fritsch | |
| 6,282,653 B1 | | 8/2001 | Berstis et al. | |
| 6,324,658 B1 | | 11/2001 | Jasperneite et al. | |
| 6,334,214 B1 | * | 12/2001 | Horstmann | 717/170 |
| 6,363,356 B1 | | 3/2002 | Horstmann | |
| 6,367,073 B2 | | 4/2002 | Elledge | |
| 6,389,403 B1 | | 5/2002 | Dorak | |
| 6,389,432 B1 | | 5/2002 | Pothapragada et al. | |
| 6,434,535 B1 | | 8/2002 | Kupka | |
| 6,436,230 B1 | | 8/2002 | Kondo et al. | |
| 6,452,903 B1 | | 9/2002 | Peck et al. | |
| 6,484,182 B1 | | 11/2002 | Dunphy | |
| 6,505,169 B1 | | 1/2003 | Bhagavath et al. | |
| 6,522,866 B1 | | 2/2003 | Merkle et al. | |
| 6,529,949 B1 | | 3/2003 | Getsin | |
| 6,535,871 B1 | | 3/2003 | Romansky et al. | |
| 6,587,837 B1 | | 7/2003 | Spagna et al. | |
| 6,640,093 B1 | | 10/2003 | Wildhagen | |
| 6,654,754 B1 | | 11/2003 | Knauft et al. | |
| 6,697,944 B1 | | 2/2004 | Jones et al. | |
| 6,704,733 B2 | | 3/2004 | Clark et al. | |
| 6,766,064 B1 | | 7/2004 | Langan et al. | |
| 6,772,340 B1 | * | 8/2004 | Peinado et al. | 713/168 |
| 6,775,655 B1 | | 8/2004 | Peinado et al. | |
| 6,824,051 B2 | * | 11/2004 | Reddy et al. | 235/380 |
| 6,854,061 B2 | | 2/2005 | Cooper | |
| 6,871,220 B1 | | 3/2005 | Rajan et al. | |
| 6,947,981 B2 | | 9/2005 | Lubbers et al. | |
| 6,981,217 B1 | | 12/2005 | Knauft et al. | |
| 6,990,512 B1 | | 1/2006 | Major et al. | |
| 6,996,544 B2 | | 2/2006 | Sellars et al. | |
| 7,007,042 B2 | | 2/2006 | Lubbers et al. | |
| 7,024,393 B1 | | 4/2006 | Peinado et al. | |
| 7,036,011 B2 | | 4/2006 | Grimes et al. | |
| 7,051,005 B1 | | 5/2006 | Peinado et al. | |
| 7,054,443 B1 | | 5/2006 | Jakubowski et al. | |
| 7,065,507 B2 | | 6/2006 | Mohammed et al. | |
| 7,069,271 B1 | * | 6/2006 | Fadel et al. | 705/26.7 |
| 7,076,468 B2 | * | 7/2006 | Hillegass et al. | 705/56 |
| 7,103,351 B2 | | 9/2006 | Chaudhari et al. | |
| 7,103,574 B1 | | 9/2006 | Peinado et al. | |
| 7,103,645 B2 | * | 9/2006 | Leighton et al. | 709/219 |
| 7,110,982 B2 | | 9/2006 | Feldman et al. | |
| 7,120,250 B2 | | 10/2006 | Candelore | |
| 7,120,429 B2 | | 10/2006 | Minear et al. | |
| 7,124,301 B1 | | 10/2006 | Uchida | |
| 7,124,302 B2 | | 10/2006 | Ginter et al. | |
| 7,149,722 B1 | | 12/2006 | Abburi | |
| 7,152,091 B2 | | 12/2006 | Kuriyama | |
| 7,155,415 B2 | * | 12/2006 | Russell et al. | 705/59 |
| 7,171,662 B1 | | 1/2007 | Misra et al. | |
| 7,188,342 B2 | | 3/2007 | DeMello et al. | |
| 7,200,575 B2 | | 4/2007 | Hans et al. | |
| 7,203,758 B2 | | 4/2007 | Cook et al. | |
| 7,222,078 B2 | | 5/2007 | Abelow | |
| 7,249,060 B2 | | 7/2007 | Ling | |
| 7,249,103 B2 | | 7/2007 | Shull | |
| 7,277,870 B2 | | 10/2007 | Mourad et al. | |
| 7,292,773 B2 | | 11/2007 | Angel | |
| 7,346,920 B2 | | 3/2008 | Lamkin | |
| 7,356,557 B2 | | 4/2008 | Kikuchi et al. | |
| 7,373,391 B2 | | 5/2008 | Iinuma | |
| 7,395,244 B1 | | 7/2008 | Kingsford | |
| 7,516,493 B2 | | 4/2009 | Matsuyama et al. | |
| 7,523,071 B2 | | 4/2009 | Fox | |
| 7,565,429 B1 | | 7/2009 | Fernandez Gutierrez | |
| 7,574,486 B1 | | 8/2009 | Cheng et al. | |
| 7,593,902 B2 | | 9/2009 | Murase | |
| 7,603,409 B2 | | 10/2009 | Kobayashi et al. | |
| 7,636,792 B1 | | 12/2009 | Ho | |
| 7,664,709 B2 | | 2/2010 | Chatani | |
| 7,702,536 B1 | | 4/2010 | Alabraba | |
| 7,707,115 B2 | | 4/2010 | Goringe et al. | |
| 7,743,161 B2 | | 6/2010 | Dey et al. | |
| 7,747,466 B2 | | 6/2010 | Fernandez | |
| 7,809,790 B2 | | 10/2010 | Fernandez Gutierrez | |
| 7,860,963 B2 | | 12/2010 | Matsuoka et al. | |
| 7,882,037 B2 | | 2/2011 | Hirsch | |
| 7,913,314 B2 | * | 3/2011 | Orthlieb et al. | 726/33 |
| 7,937,486 B2 | * | 5/2011 | Ohsumi | 709/231 |
| 7,988,554 B2 | | 8/2011 | LeMay | |
| 8,001,565 B2 | * | 8/2011 | Kahn et al. | 725/39 |
| 2001/0044851 A1 | | 11/2001 | Rothman et al. | |
| 2002/0073084 A1 | | 6/2002 | Kauffman et al. | |
| 2002/0091570 A1 | | 7/2002 | Sakagawa | |
| 2002/0091584 A1 | | 7/2002 | Clark et al. | |
| 2002/0097728 A1 | | 7/2002 | Hinderks et al. | |
| 2002/0107809 A1 | | 8/2002 | Biddle et al. | |
| 2002/0116517 A1 | | 8/2002 | Hudson et al. | |
| 2002/0133518 A1 | | 9/2002 | Landsman | |
| 2002/0138441 A1 | | 9/2002 | Lopatic | |
| 2002/0169833 A1 | | 11/2002 | Tani et al. | |
| 2002/0188523 A1 | * | 12/2002 | Hyyppa et al. | 705/26 |
| 2003/0007646 A1 | | 1/2003 | Hurst et al. | |
| 2003/0046367 A1 | | 3/2003 | Tanaka | |
| 2003/0050887 A1 | * | 3/2003 | Geiger | 705/37 |
| 2003/0066884 A1 | * | 4/2003 | Reddy et al. | 235/382.5 |
| 2003/0088515 A1 | * | 5/2003 | Cooper et al. | 705/50 |
| 2003/0120557 A1 | | 6/2003 | Evans et al. | |
| 2003/0149975 A1 | | 8/2003 | Eldering et al. | |
| 2003/0181242 A1 | * | 9/2003 | Lee et al. | 463/42 |
| 2003/0185399 A1 | | 10/2003 | Ishiguro | |
| 2003/0188317 A1 | | 10/2003 | Liew et al. | |
| 2003/0223094 A1 | | 12/2003 | Naito | |
| 2003/0236756 A1 | | 12/2003 | Humpleman et al. | |
| 2004/0003398 A1 | | 1/2004 | Donian | |
| 2004/0059708 A1 | | 3/2004 | Dean et al. | |
| 2004/0088349 A1 | | 5/2004 | Beck et al. | |
| 2004/0093327 A1 | | 5/2004 | Anderson et al. | |
| 2004/0093595 A1 | * | 5/2004 | Bilange | 717/171 |
| 2004/0098344 A1 | | 5/2004 | Nakanishi et al. | |
| 2004/0139204 A1 | | 7/2004 | Ergezinger et al. | |
| 2004/0143667 A1 | | 7/2004 | Jerome | |
| 2004/0148229 A1 | * | 7/2004 | Maxwell | 705/26 |
| 2004/0205114 A1 | | 10/2004 | Kinoshita | |
| 2004/0230806 A1 | * | 11/2004 | Lisanke | 713/182 |
| 2004/0255135 A1 | * | 12/2004 | Kitaya et al. | 713/193 |
| 2005/0004873 A1 | | 1/2005 | Pou et al. | |
| 2005/0021467 A1 | | 1/2005 | Franzdonk | |
| 2005/0034171 A1 | | 2/2005 | Benya | |
| 2005/0038752 A1 | | 2/2005 | Gaetano | |
| 2005/0055309 A1 | | 3/2005 | Williams | |
| 2005/0076104 A1 | | 4/2005 | Liskov et al. | |
| 2005/0091166 A1 | * | 4/2005 | Seamans | 705/52 |
| 2005/0114205 A1 | | 5/2005 | Nelson et al. | |
| 2005/0144136 A1 | | 6/2005 | Murashita | |
| 2005/0146966 A1 | * | 7/2005 | Kawamura | 365/222 |
| 2005/0251489 A1 | | 11/2005 | Coley et al. | |
| 2005/0288999 A1 | * | 12/2005 | Lerner et al. | 705/14 |
| 2006/0013557 A1 | | 1/2006 | Poslinski | |
| 2006/0031175 A1 | | 2/2006 | Sellars et al. | |
| 2006/0031892 A1 | | 2/2006 | Cohen | |
| 2006/0059223 A1 | | 3/2006 | Klemets et al. | |

(56) References Cited

U.S. PATENT DOCUMENTS

| | | | |
|---|---|---|---|
| 2006/0089912 A1* | 4/2006 | Spagna et al. | 705/51 |
| 2006/0095792 A1 | 5/2006 | Hurtado et al. | |
| 2006/0136967 A1 | 6/2006 | Hellman | |
| 2006/0143135 A1* | 6/2006 | Tucker et al. | 705/59 |
| 2006/0143473 A1 | 6/2006 | Kumar | |
| 2006/0167812 A1* | 7/2006 | Bhambri et al. | 705/59 |
| 2006/0218602 A1 | 9/2006 | Sherer et al. | |
| 2006/0251387 A1 | 11/2006 | Tanikawa et al. | |
| 2007/0038567 A1 | 2/2007 | Allaire | |
| 2007/0067495 A1 | 3/2007 | Levy | |
| 2007/0083886 A1 | 4/2007 | Kauffman et al. | |
| 2007/0094691 A1 | 4/2007 | Gazdzinski | |
| 2007/0118849 A1 | 5/2007 | Kisel et al. | |
| 2007/0140318 A1 | 6/2007 | Hellman | |
| 2007/0155204 A1* | 7/2007 | Klitsner et al. | 439/131 |
| 2007/0162560 A1 | 7/2007 | Jin | |
| 2007/0168294 A1 | 7/2007 | Tsurukawa | |
| 2007/0220430 A1 | 9/2007 | Sato | |
| 2007/0244823 A1* | 10/2007 | Thomas Motley et al. | 705/59 |
| 2007/0255576 A1 | 11/2007 | Patterson | |
| 2007/0282714 A1 | 12/2007 | Aydar et al. | |
| 2007/0294772 A1 | 12/2007 | Hydrie et al. | |
| 2008/0022347 A1 | 1/2008 | Cohen | |
| 2008/0027750 A1 | 1/2008 | Barkeloo et al. | |
| 2008/0069099 A1 | 3/2008 | Tani et al. | |
| 2008/0077478 A1 | 3/2008 | Kim | |
| 2008/0086570 A1 | 4/2008 | Dey et al. | |
| 2008/0092168 A1 | 4/2008 | Logan et al. | |
| 2008/0092182 A1 | 4/2008 | Conant | |
| 2008/0114695 A1 | 5/2008 | Gutierrez | |
| 2008/0141307 A1 | 6/2008 | Whitehead et al. | |
| 2008/0148230 A1* | 6/2008 | Kemmler | 717/120 |
| 2008/0172300 A1 | 7/2008 | Karki et al. | |
| 2008/0177630 A1 | 7/2008 | Maghfourian et al. | |
| 2008/0195761 A1 | 8/2008 | Jabri et al. | |
| 2008/0249872 A1 | 10/2008 | Russell et al. | |
| 2008/0250029 A1 | 10/2008 | Fernandez | |
| 2008/0255943 A1 | 10/2008 | Morten et al. | |
| 2008/0288976 A1 | 11/2008 | Carson et al. | |
| 2008/0320605 A1 | 12/2008 | Ben-Yaacov et al. | |
| 2009/0083144 A1 | 3/2009 | Menditto et al. | |
| 2009/0204541 A1 | 8/2009 | Zhuk et al. | |
| 2009/0205031 A1 | 8/2009 | Sato et al. | |
| 2009/0240768 A1 | 9/2009 | Fernandez Gutierrez | |
| 2009/0240786 A1 | 9/2009 | Fernandez Gutierrez | |
| 2009/0240827 A1 | 9/2009 | Fernandez Gutierrez | |
| 2009/0240828 A1 | 9/2009 | Fernandez Gutierrez | |
| 2009/0240830 A1 | 9/2009 | Fernandez Gutierrez | |
| 2009/0286560 A1 | 11/2009 | Willis | |
| 2009/0310609 A1 | 12/2009 | Fernandez Gutierrez | |
| 2010/0054247 A1 | 3/2010 | Fernandez Gutierrez | |
| 2010/0054248 A1 | 3/2010 | Fernandez Gutierrez | |
| 2010/0054249 A1 | 3/2010 | Fernandez Gutierrez | |
| 2010/0070355 A1 | 3/2010 | Fernandez Gutierrez | |
| 2010/0076827 A1 | 3/2010 | Fernandez Gutierrez | |
| 2010/0082835 A1 | 4/2010 | Fernandez Gutierrez | |
| 2010/0153231 A1 | 6/2010 | Fernandez Gutierrez | |
| 2010/0153873 A1 | 6/2010 | Fernandez Gutierrez | |
| 2010/0172351 A1 | 7/2010 | Fernandez Gutierrez | |
| 2010/0172352 A1 | 7/2010 | Fernandez Gutierrez | |
| 2010/0172353 A1 | 7/2010 | Fernandez Gutierrez | |
| 2010/0198982 A1 | 8/2010 | Fernandez Gutierrez | |
| 2010/0228647 A1 | 9/2010 | Fernandez Gutierrez | |
| 2010/0235237 A1 | 9/2010 | Fernandez Gutierrez | |
| 2010/0235262 A1 | 9/2010 | Gutierrez | |
| 2010/0235263 A1 | 9/2010 | Fernandez Gutierrez | |
| 2010/0235264 A1 | 9/2010 | Fernandez Gutierrez | |
| 2010/0235265 A1 | 9/2010 | Fernandez Gutierrez | |
| 2010/0250400 A1 | 9/2010 | Fernandez Gutierrez | |
| 2010/0257051 A1 | 10/2010 | Fernandez Gutierrez | |
| 2010/0274664 A1 | 10/2010 | Fernandez Gutierrez | |
| 2011/0010299 A1 | 1/2011 | Byrne et al. | |
| 2011/0060688 A1 | 3/2011 | Fernandez Gutierrez | |
| 2011/0060689 A1 | 3/2011 | Fernandez Gutierrez | |
| 2011/0078044 A1 | 3/2011 | Fernandez Gutierrez | |
| 2011/0137738 A1 | 6/2011 | Fernandez | |
| 2011/0137754 A1 | 6/2011 | Fernandez | |
| 2012/0066669 A1* | 3/2012 | Bouzakis et al. | 717/168 |

FOREIGN PATENT DOCUMENTS

| | | |
|---|---|---|
| JP | 2002175436 | 6/2002 |
| JP | 2002175436 A | 6/2002 |
| JP | 2003186905 A | 7/2003 |
| JP | 2003256670 | 9/2003 |
| JP | 2003256670 A | 9/2003 |
| JP | 2003288130 | 10/2003 |
| JP | 2003288130 A | 10/2003 |
| KR | 2003075948 A | 9/2003 |
| WO | 2006086717 A1 | 8/2006 |
| WO | 2006138432 A2 | 12/2006 |
| WO | WO2008055562 A1 | 5/2008 |
| WO | WO2008122308 A1 | 10/2008 |
| WO | WO2009065526 A1 | 5/2009 |
| WO | 2009115631 A1 | 9/2009 |
| WO | 2010125052 A2 | 11/2010 |

OTHER PUBLICATIONS

Radding, A.; "Update reqs challenge software distribution tools;" Software Magazine [Online]; Sep. 1993; vol. 13, No. 14 (Special); pp. 31-41.

Digital Trends, "Philips Wants to Patent Must-See Ads," Apr. 19, 2006, available at http://www.digitaltrends.com/ home-theater/philips-wants-to-patent-must-see-ads/.

Transmittal of the International Search Report and the Written Opinion of the International Searching Authority for International Application No. PCT/EP2010/055608, European Patent Office, Nov. 4, 2010.

Spanish Patent and Trademark Office, International Preliminary Report on Patentability for International Application No. PCT/ES2009/070064, mailed Jul. 14, 2009. (Spanish Version).

Spanish Patent and Trademark Office, International Preliminary Report on Patentability for International Application No. PCT/ES2009/070064, mailed Oct. 20, 2010. (English Translation).

Transmittal of the International Preliminary Report on Patentability and the Written Opinion of the International Searching Authority for International Application No. PCT/EP2008/009616, European Patent Office, May 25, 2010.

Jung, Sun-Mi et al., Abstract, Accession No. 7245617, Impletementation of the Agent Based Digital Rights Management System for Interaction on the Web, published in Proceedings of the IASTED International Conference Internet and Multimedia Systems, conference article from conference held Aug. 13-16, 2008 in Honolulu, HI, USA.

Arnab, Alapan et al., Verifiable Digital Object Identity System, pp. 19-25, published in DRM '06, Oct. 30, 2006, by the Association for Computing Machinery (ACM), in Alexandria, VA, USA.

Paskin, N., Abstract, Accession No. 6191148, Title: The Digital Object Identifier System: Digital Technology Meets Content Management, Interlanding and Document Supply, 1999, vol. 27, Issue 1, pp. 13-16.

Liu, Qiong et al., "Digital Rights Management for Content Distribution, School of Informatics Technology and Computer Science", Australasian Information Security Workshop 2003, in Adelaide, Australia, in 2003.

Delgado, Jaime et al., "Standardisation of the Management of Intellectual Property Rights in Multimedia Content", IEEE Proceedings of the Second International Conference on WEB Delivering of Music, Jan. 2002.

Gil, Rosa et al., "Managing Intellectual Property Rights in the WWW: Patterns and Semantics", 2005, IEEE Proceedings of the First International Conference on Automated Production of Cross Media Content for Multi-Channel Distribution, 2005.

M2 Presswire, Iomega: Iomega and Reciprocal Announce Strategic Relationship to Advance Secure Distribution of Portable Content: Partnership Enables Consumers to Transfer and Bind Secure Downloaded Content to Portable Zip Disks and Other Iomega Products, Jun. 27, 2001.

(56) References Cited

OTHER PUBLICATIONS

Transmittal of the International Search Report and the Written Opinion of the International Searching Authority for International Application No. PCT/EP2007/005049, European Patent Office, Dec. 17, 2007.

Hwang, Seong-Oun et al., "Modeling and Implementation of Digital Rights", The Journal Systems and Software, 2004, vol. 73, pp. 533-549, 2004.

International Search Report mailed Dec. 28, 2007 issued in corresponding International Application No. PCT/EP2007/008195.

* cited by examiner

PROCESS FOR THE ON-LINE SALE OF A SOFTWARE PRODUCT

CROSS-REFERENCE TO RELATED APPLICATION(S)

This application is related to and claims the benefit as a continuation of U.S. Ser. No. 11/797,633, filed May 4, 2007, which is related to and claims priority to Spanish Application No. 200602849 filed Nov. 10, 2006, each of which being incorporated by reference herein.

BACKGROUND

1. Field

The invention is included in the field of on-line sales of software products through a data network, for example, the Internet.

According to an aspect of the embodiments, a process, including an apparatus and computer readable medium thereof, of on-line sale of software product use licenses through a data network, are provided by:
 offering online each of said software products to be downloaded online, by a plurality of vendor sites;
 offering for purchase online a use license for one of said software products offered by one of said vendor sites and downloaded on-line; and
 authorizing activation of said use license on-line by a licensing site different from said vendor sites.

The embodiments also comprise a software component which allows carrying out said process, including the apparatus and the computer readable medium thereof.

In the sense of this description and of the attached claims, software product refers to a product formed by a set of instructions which can be loaded in the memory of a computer and can be executed individually or in combination with another software product. According to this definition, a computer program, an installation program installing a program in the computer, a package for updating a computer program, an installing file downloading a computer program or an updating thereof on-line, a computer program library, etc. are examples of software products.

A site refers to any computer installation associated with a data network service providing a virtual site connected to the data network and able to exchange information and services on-line with other sites through said data network. According to an aspect of an embodiment, when the data network is Internet, the vendor sites and licensing sites can be websites comprising a main webpage identified by a URL address.

A software component is understood to refer to a set of instructions which can be loaded in the memory of a computer and incorporated in a software product to be executed together with the latter and provide specific functions. According to this definition, a dynamic library, a class or set of classes, a control or class with a graphic interface, a set of functions or any other type of software module are examples of software components.

2. Description of the Related Art

Software manufacturing companies currently sell their software products both by direct sales from their own websites and by indirect sales through their distributors.

In the case of direct sales, the purchaser usually downloads a software product from the software company's website and pays for and obtains a use license on-line on said website. Another commonly used option consists of the purchaser ordering the software product on-line on the company's website and the latter sending the software product by mail in the form of a CD or a DVD packed in a box containing a serial number for obtaining a use license.

Indirect sales through distributors allow a software company to multiply its sales channels and drastically reduce or even eliminate its own sales structure. Currently, when the sale is carried out indirectly through a shop or distributor, the software product is distributed in the form of a physical carrier, such as a CD or a DVD, packed in a box containing a serial number for activating a use license. This distribution in the form of a physical product is not very efficient compared to the on-line downloading of the software product from a website because it uses human and energy resources and raw materials.

Other on-line sales systems are known in which a software company advertises its software products on several independent websites which are not connected to it. The purchaser visits one of those websites, selects one of the advertised software products and is then automatically redirected to the software manufacturing company's website where the purchaser can acquire the software product on-line, like in the case of a direct sale set forth previously. In compensation, the software manufacturing company pays the owner of the independent website a commission for each forwarding to its own website. These sales systems are not indirect sales systems through distributors, rather they are similar to the case of a direct sale set forth previously, with the only difference that they allow advertising the products with a greater reach through independent websites. The software manufacturing company continues to support on its own website the necessary structure for carrying out the whole sales process, including the structure allowing downloading the software product, the payment for and the granting of a use license.

SUMMARY

The applicant has designed a new method for the on-line sale of software products through a data network in the form of a method, an apparatus and computer readable medium thereof, for the on-line sale of use licenses for the software products.

The new method of on-line sale designed by the applicant combines the advantages of indirect sales through distributors (multiplication of sales channels and reduction or elimination of its own sales structure) with the advantages of direct sales (the possibility of delivering the software product on-line, without a physical carrier).

This new method of sale is based on separating, on different sites (for example different websites), the process for acquiring the software product, understood as the process by which the purchaser carries out a commercial transaction for acquiring a use license for said software product, from the process for activating said use license for the software product, according to which the purchaser obtains the serial number, keys or any other type of data or program allowing the purchaser to use the software product in a certain computer or computers.

According to this new method, each software product is offered by a plurality of vendor sites for its on-line acquisition from an acquisition site, and the process for activating a use license for the software is carried out in a licensing site different from said vendor sites. According to this method, the on-line acquisition of the software product includes an on-line download of said software product as well as the on-line purchase of a use license on the vendor site which offered the software product. The software product can be downloaded directly from the vendor site itself offering said software product or from a downloading site associated to said vendor site. The use license is purchased on said vendor site, at the time of the download of the software product or afterwards, when it is necessary to obtain a use license for said software product. Once the use license has been paid for, an on-line communication is set up with the licensing site in order to activate it. Thus, in the sense of this description and of the attached claims, it must be understood that the use license which is purchased on said vendor site is an inactive use license, which remains inactive until the activation thereof by said licensing site. In other words, the purchased use license does not authorize use of the software product until the activation of said use license by the licensing site.

When the data network in which this method is implemented is Internet, the licensing site is normally the website of a software manufacturing company and the vendor sites are websites of distribution companies which can be independent of the manufacturing company. The advantage of this new method is that the software manufacturing company multiplies the range for spreading its software products and at the same time it is released from the obligation of having to manage the downloading and the payment for its software product.

Said new method provides that the purchaser can purchase the use license on-line on the vendor site at the same time the purchaser downloads the software product and, subsequently or simultaneously, carry out the process for activating the use license by communicating with the licensing site. It also provides that the purchaser can download a demonstration version of the software product from the vendor site that can only be used in a trial period after which it is necessary to obtain a use license. In this case, the use license is purchased from the vendor site on-line after downloading the software product, at the time in which the purchaser decides to purchase the use license, and then the purchaser can carry out the process for activating the license by communicating with the licensing site.

In both cases, after the distribution companies have collected payment made by the purchaser, they pay an agreed amount to the manufacturing company for the sale of the use license for the software product.

Said new method also provides an especially advantageous configuration in which a supervising entity is created which, through a supervising site which can set up on-line communications with the acquisition site, the vendor site and the licensing site, ensures that the sales process is carried out in suitable conditions. A manufacturing company and a distribution company can thus register in the supervising entity an agreement according to which the former authorizes the latter to offer its software product under certain conditions. The manufacturing company can withdraw its authorization in the event of non-compliance with the agreement. The supervising entity can also register and authorize the user purchasers of the system. Likewise, the supervising entity can intervene in the different sales processes to ensure that they are carried out in suitable conditions; for example, it can verify that the distribution company is authorized by the manufacturing company to sell the product, that the distribution company pays the manufacturing company the part specified in the agreement for the sale of software products, that the purchaser is a registered and authorized user, that the manufacturing company really has the power to grant use licenses for the software product, etc.).

The implementation of this new method for the on-line sale of software products, or more specifically the method for the on-line sale of use licenses for software products, has a series of technical problems which make it difficult to carry out.

In the first place, after having downloaded the software product on-line from the vendor site offering it or from a downloading site associated to the latter, the method requires that said vendor site can be identified in a reliable manner. Furthermore, this identification information of the vendor site must be available at the time that the end user decides to purchase the use license for the software product the purchaser has downloaded, a time which may not coincide with the download of the software product, but with the installation of the latter in equipment or with the expiration date of a demonstration version of the software product or with the expiration date of the temporary use license purchased previously.

Furthermore, the possibility of identifying the vendor site before the activation of the use license is essential because the licensing site has to be able to collect from said vendor site the part of the sale corresponding to it, but it must also have the certainty that the identified vendor site is really the one who has carried out the sale and is an authorized site. It is also necessary to be able to assure the purchaser that the purchaser will be able to activate the use license on the licensing site after purchasing it on a vendor site.

Secondly, the method requires a standard implementation that can be generalized for all types of software products. It must specifically be prevented that a licensing site which wants to sell its software products through this method has to adapt a software product for each vendor site.

One example purpose of the invention is to provide a process for implementing said new method of on-line sale designed by the applicant, which allows providing the licensing site, in a safe and effective manner, with the identifying data of the vendor site which has offered the software product for its on-line download and in which a use license has been purchased, such that the identifying data of the vendor site can be provided at the time in which the end user needs to activate the use license for the software product, and all of the above such that a licensing site can distribute its software product according to this method of sale without needing to adapt the software product for each vendor site.

The embodiments can be achieved by a process (including an apparatus and computer readable media thereof) of an on-line sale by:

incorporating a software component to each of said software products offered by a vendor site, said software component executable together with said software product and managing the activation of a use license for said software product;

associating a transmission of identifying data of the vendor site offering said software product to each of said on-line downloading-process of one of said software products;

wherein said software component, when executed together with said software product in an equipment, is able to locally access said identifying data of the vendor site and to access identifying data of the licensing site, and launches a process for activating said use license for the software product comprising setting up an on-line communication with said licensing site during which said software component obtains from said licensing site activation data necessary for activating said use license.

The technical problems set forth are solved due to the fact that the identifying data of the vendor site are transferred during the software product downloading process, and to the fact that the software product incorporates said software component, which does not need to be customized for each vendor site, and is able to locally retrieve, in the equipment where the software product is being executed, the identifying data of the vendor site and of the licensing site. This solution further allows preserving the own or existing copy protection system of existing software products, given that the component can be incorporated in the software product and executed without interfering with said protection system. Nevertheless, as will be seen below in the description of several embodiments of the invention, the process for activating the use license applied by the component is by itself a copy protection system.

When the data network in which the method of sale according to the invention is Internet, the identifying data of the vendor site which are transmitted during the downloading process comprise the location of said vendor site in the network in the form of its URL address.

In the process according to the invention, setting up a communication between two sites must be understood as including both a direct communication between the two sites and an indirect communication through an intermediate site. Thus, for example, the communications set up by the software component with the vendor site or with the licensing site, from the equipment in which the software product is installed, can be carried out through an intermediate site without this affecting the principle of the invention. Indeed, what is important is that the software component locally accesses identifying data of the vendor site and of the licensing site, and from this data it is able to locate these sites in the network on one hand and on the other hand to provide the licensing site with data referring to the vendor site through which the download has been carried out and in which a use license has been purchased. The software component preferably communicates directly with the vendor site and directly with the licensing site. However, it can be provided that in the process for activating the license, the software component communicates directly with the vendor site, it provides it with the identifying data of the licensing site and then the communication with the licensing site is carried out directly through the vendor site. In this case, the process for activating the license would be carried out in the vendor site, but it is really the licensing site which is providing on-line the necessary data for activating the license through the vendor site. On the contrary, it can be provided that the software component communicates directly with the licensing site and that the communication with the vendor site to make the purchase is carried out through the licensing site. As will be seen below, it can also be provided that a supervising site intervenes as an intermediary in the different on-line communications.

The process according to the invention provides that the identifying data of the licensing site can be incorporated in the software product or in the software component. This last solution offers the advantage that the software manufacturing company can have a licensing site different from its main site, therefore the management of the former is facilitated. To that end, the software product incorporates therein, as usual, identifying data including the URL address of the main webpage of said company, whereas the software component incorporates therein the identifying data of the licensing site. Another advantage is that a single software component serves to integrate the identifying data of the licensing site in all the software products.

Preferably, after obtaining said activation data from the licensing site, the software component activates a use license for said software product. Therefore, the entire process for activating the license, leading to the release of the software product so that it can be used, is advantageously done by the software component itself.

Preferably, said on-line purchase on a vendor site of a use license for the software product preferably comprises a transmission of a purchase receipt from said vendor site, and when said software component is executed in said equipment, it locally accesses said purchase receipt and transmits it to the licensing site during the on-line communication during which the software component obtains said activation data from said licensing site. A guarantee that the purchase has been made on one of the authorized vendor sites is thus offered to the licensing site in a particularly efficient and robust manner. The purchase receipt advantageously includes identifying data of the vendor site. Said on-line purchase also preferably comprises setting up an on-line communication between said vendor site and said licensing site, during which said vendor site transmits a purchase receipt to said licensing site. In this way, the licensing site knows that the use license has been purchased and can claim payment of its corresponding part, without needing to wait until the purchaser had installed the software product in an equipment.

In one embodiment of the process according to the invention, an acquisition site sets up an on-line communication with one of said vendor sites, during which said on-line software product downloading process as well as on-line purchase of the use license for the software product are carried out. This embodiment generally corresponds to the case in which a purchaser downloads a final commercial version of the software product, i.e. a version with no demonstration period, instead of a demonstration version and then the use license must be purchased together with the download. The purchaser obtains the activation of the use license when the software product is installed, when the software component communicates with the licensing site during the process for activating the license.

In another embodiment, which is generally applied to the case in which a purchaser downloads a demonstration version of the software product, when the software component is executed in said equipment, it locally accesses the identifying data of the vendor site and sets up an on-line communication with said vendor site, during which said software component operates the on-line purchase of the use license of said software product. Therefore, the software component only launches the process for the on-line purchase of a use license when the user so decides, for example, by responding to an invitation of the software component itself when the test period of the demonstration version has concluded. Preferably, when the software component is executed in said equipment, it sets up an on-line communication with said licensing site, during which it communicates said identifying data of the vendor site to said licensing site so that said licensing site authorizes the on-line purchase of the software product use license on said vendor site, therefore the purchaser has the certainty that the sale is authorized by the licensing site and therefore the purchaser will be able to subsequently activate the use license.

Several solutions according to the invention can be provided for transmitting the identifying data of the vendor site. In a first solution, said identifying data are introduced in a downloadable file which is downloaded by the acquisition site together with the software product during the downloading process in the on-line communication set up by the acquisition site with the vendor site. In a preferred second solution, the software product is contained in a single downloadable file which is downloaded by the acquisition site during the downloading process, in the on-line communication set up by the acquisition site with the vendor site, and the transmission of identifying data of the vendor site is carried out by introducing said identifying data as file properties metadata of said downloadable file. Introducing said identifying data of the vendor site as file properties metadata of said downloadable file can be done in each of the vendor sites before the software product downloading process, but it is preferably done at the time in which the acquisition site downloads said downloadable file during the downloading process. Another solution includes the transmission of identifying data of the vendor site by transmitting a code to a user operating the software product downloading process, said code being subsequently provided to the software component when it is executed in said equipment. This code can be provided, for example, by means of an on-screen display or by sending it by e-mail.

In an advantageous embodiment, the intervention of a single supervising site, different from the licensing sites and from the vendor sites, is provided. Said single supervising site intervenes as an intermediary in the different communications between the sites participating in the on-line sale, for the purpose of ensuring that said sale is carried out in suitable conditions. The software product downloading process from a vendor site can thus comprise setting up an on-line communication with said supervising site. Likewise, the process for the on-line purchase or the process for activating the license, launched by the software component when it is executed in said equipment, can comprise setting up an on-line communication with said supervising site. The process according to the invention can also comprise setting up an on-line communication between the vendor site and said supervising site, as well as setting up an on-line communication between the licensing site and said supervising site.

The invention also relates to the software component used in the described process, which is an essential element for implementing said process according to the invention.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
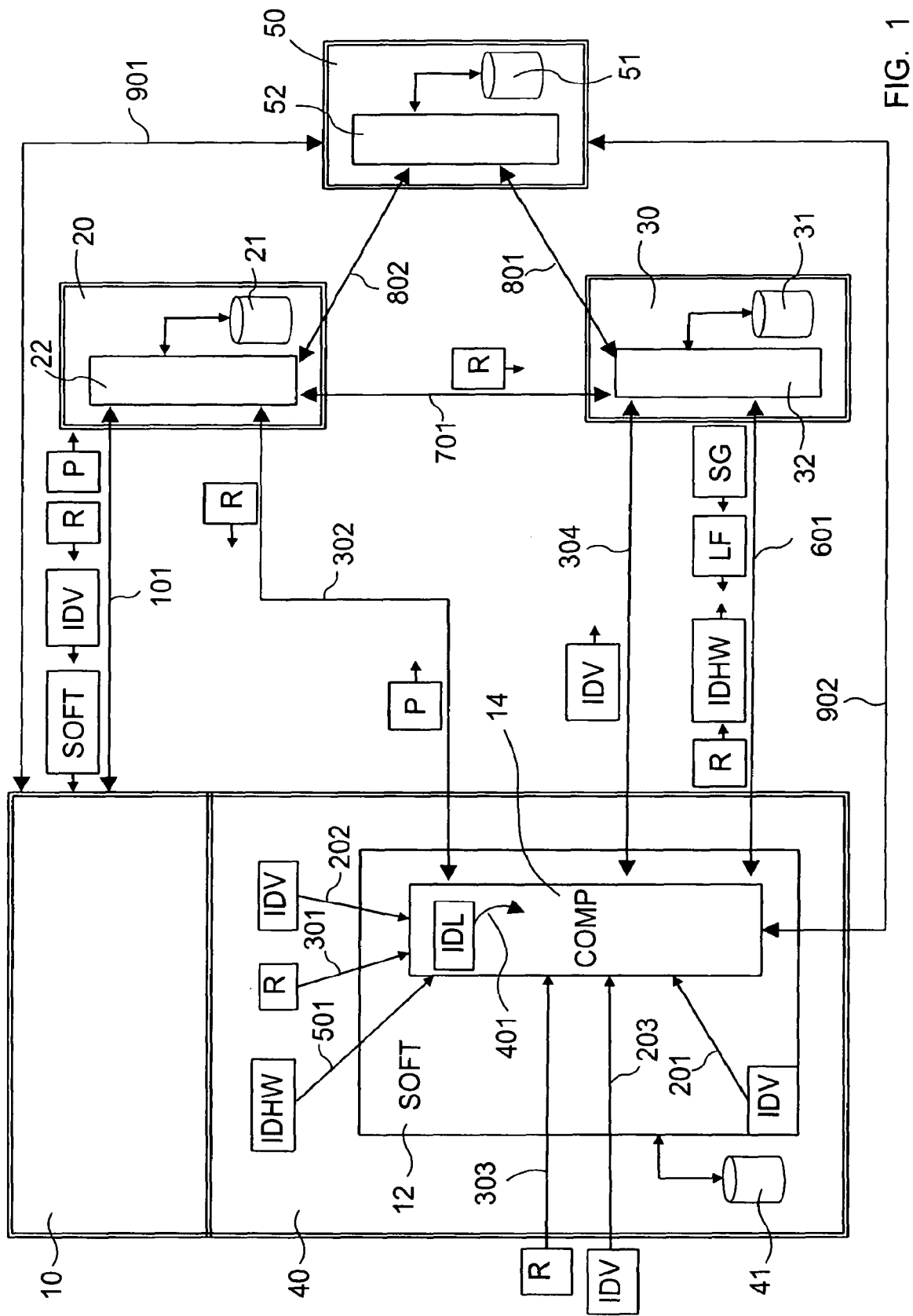
FIG. 1 is a block diagram of a system for the on-line sale of software products use licenses and corresponding processes, according to the embodiments of the invention.

FIG. 1 shows the basic process of a new method for the on-line sale of software product use licenses, according to an embodiment of the invention, including embodiment variants.

In this example, the data network in which the process is installed is the Internet. The system is made up of a plurality of manufacturing companies each having a licensing website, a plurality of distribution companies each having a vendor website where a software product 12 of the manufacturing companies are offered, and a plurality of computers connected to Internet forming potential acquisition sites for the on-line acquisition of software products offered by the vendor sites. The invention also provides the possibility that the acquisition sites are hosting servers which acquire and install the software product 12 to then later grant rental licenses to a plurality of users having access to said server.

The software product(s) (SOFT) 12 are typically computer programs, being able to be entire programs, an installation program which installs a computer program or downloads the installation files from a computer program, upgrades or updates of programs that are already installed, etc. These software products 12 shall hereinafter be generically referred to as programs 12.

The manufacturing companies adhering to the online sale of software product use license system (hereinafter referred to as system) in order to be able to sell their programs incorporate with their program 12 a software component (COMP) 14 that is specific for the system. The software component 14 operation can be identical for all of manufacturing companies. To distinguish between different licensing and/or vendor sites, modifiable properties of the component 14 that can be modified during programming are used. The software component 14 shall hereinafter simply be referred to as component 14.

The component 14 refers to the encapsulated group of classes and processes with their corresponding properties, which allows by interface or integration thereof in a third party application and within the execution environment of said application, the execution of certain functionalities which are predefined in the component. It can be presented in the form of an executable file or dynamic library which is included or invoked from a third party application, during the design of said application. According to an aspect of the embodiment, component incorporation refers to interfacing and/or integrating. The ways of including a component within an application may vary according to the programmer or the environment in which the application is programmed, the following ways of doing so being the most common examples:

Including the component from a graphic menu. The programmer drags the component (graphic representation thereof) from the toolbox of the programming environment and inserts the component in the form of the application. From that moment on, the programmer has access to the component properties and can modify them and/or invoke the methods that have been described in the component.

Including the component from source code. The programmer includes the code lines necessary for invoking the component (whether it is in library or executable form) within the source code block belonging to a form of the application. From that moment on the programmer has access to the component properties and can modify them and/or invoke the methods which have been described in the component.

One skilled in the art of programming can implement the processes of including and using the component with a program, therefore it is not considered necessary to further describe them.

The component interacts with the program, for example, by a series of functions or methods. In this example, the two most important methods, which will be described below, are the method which allows carrying out the purchase of a license on-line (FIG. 1, reference 302) and the method which allows activating a license (FIG. 1, reference 601).

During the purchasing process, the component shows a series of displays (graphical interface) for selecting the type of use license which is desired to be acquired and/or introducing the data needed to purchase the license.

The use license which the user purchases can be of several types. For example, it can be an indefinite license giving the purchaser the right to use the program for an indefinite time period, or a temporary license allowing use of the program for a limited time period. The use license also may or may not include the right for the user to update the program with the new versions thereof launched in the future. Therefore, for example, a temporary use license may allow the use of the program for one year, together with the new program updates that come out during that same year.

The system is preferably supervised by a single supervising site controlled by a supervising entity. Although the system embodiments are not limited to such a configuration and a plurality of supervising sites can be provided. The manufacturing companies which adhere to the system request the supervising site to register their licensing site, identify the programs which they wish to sell on-line and define the condition for the sale thereof. The distribution companies that wish to offer on their sites the programs of the manufacturing companies request in the supervisor site to register their vendor site. A licensing site and a vendor site can agree, in the supervising site, on the conditions of the sale of a program, for example, the sale price and the part that will correspond to each of them. According to an embodiment, the supervising site provides the component to the licensing sites so that the component can be incorporated with the programs. The vendor sites can obtain the programs directly from each licensing site, or through the supervising site (as the case may be), and host the programs for downloading on-line by the purchasers.

In addition to the component supplied to the licensing sites so that the component can be incorporated with their programs, the supervising site may also provide specific applications which are installed in the licensing sites and in the vendor sites for implementing the different communications of the sale process, which will be described below. These applications are not described in detail, as a person skilled in the art would have no difficulty in carrying the communications.

The incorporation of a single supervising site in the system is advantageous because it offers system reliability insurance to the different participants in the sale process. However, the system may also work without the intervention of a supervising site.

FIG. 1 is a block diagram of a system for the on-line sale of software products use licenses and corresponding processes, according to the embodiments of the invention. The user operates from a computer 40 having a communication interface 10 for communicating with Internet and a storage containing a local license database 41. In this example, the communication interface 10 of the computer 40 itself form the acquisition site from which a program SOFT is acquired on-line and the computer 40 forms the equipment where the program SOFT will be executed. However, process according to the invention is also applied to the case in which the program SOFT is acquired on-line operating from one computer and then said program SOFT is installed and executed in another computer. The other elements involved in this example are a vendor site 20, a licensing site 30 and a supervising site 50, which as mentioned above is optional, each of them provided with a main webpage, respectively 22, 32, 52, and a database, respectively 21, 31, 51.

The user sets up communication with the vendor site 20 from the acquisition site 10. This communication can be direct communication 101 or indirect communication 901 through the supervising site 50. In the latter case, the supervising site 50 deals with authenticating the identity of the acquisition site 10 as a user of the system, or it must register the user if the user is new, and may also set up a communication 802 with the vendor site 20. The user chooses a program SOFT offered on the vendor site 20 and downloads the program SOFT into the acquisition site 10 during direct communication 101. Identifying data IDV of the vendor site 20, for example, including the URL address of the vendor site 20, are transmitted along with the download. The transmission of this identifying data IDV can be done in different ways.

Preferably, the program SOFT is contained in a single downloadable file and the data IDV are included as metadata of this file. The inclusion of these data IDV as metadata of the downloadable file is usually done on each vendor site, before the download or during the download. The metadata of a file are data containing formal information of the file, such as the name, size, file type, modification date, owner, etc. For example, in the MICROSOFT WINDOWS environment, these metadata are visible from the File>Document Properties menu in the graphical interface of WINDOWS applications. The location containing these metadata in the file has several fields which are currently free or can be free, and which are used by the process according to the embodiments of the invention for storing the data IDV. It is also possible to define new properties for a file, for example, by using the MICROSOFT DSOFile.dll library. When this preferred solution is used, the data IDV are read by the component COMP as metadata of the file containing the program SOFT, as shown in 201 in FIG. 1.

An alternative solution for transmitting the data IDV includes storing them in an independent file that is downloaded together with the program SOFT. In this case, said independent file is installed in the equipment 40 together with the program SOFT and the data IDV are read by the component COMP in said independent file, as is shown in 202 in FIG. 1.

Another alternative solution includes the vendor site 20 providing the user with a code IDV, for example, by an on-screen display or by sending an e-mail, during the program SOFT downloading process, and the user then furnishes said code IDV to component COMP at the request of the latter, as is shown in 203 in FIG. 1.

If the user downloads a program SOFT of the type not having a trial period, the user purchases the program SOFT by an on-line payment P on the vendor site 20, during the communication 101, and in exchange receives a purchase receipt R containing, either explicitly or by reference, identifying data of the vendor site 20 and information on the type of license acquired. Therefore, both the IDV, for example, containing the URL address of the vendor site 20, and the purchase receipt R have been transmitted in this case from the vendor site 20 to the acquisition site 10. The transmission of the purchase receipt R can be done in the form of an independent file downloaded together with the program SOFT and it is then read by the component COMP, as is shown in 301 in FIG. 1, or by a code furnished to the user, for example, by an on-screen display or by sending an e-mail, which is then furnished to the component COMP at the request of the latter, as is shown in 303 in FIG. 1.

If the user downloads a program SOFT of the demonstration version type, which is operative for only the trial period, then the purchase P is not made during the communication 101. In this case there is no purchase receipt R; only the data IDV, for example, containing the URL address of the vendor site 20, are transmitted from the vendor site to the acquisition site 10.

Figure 2:
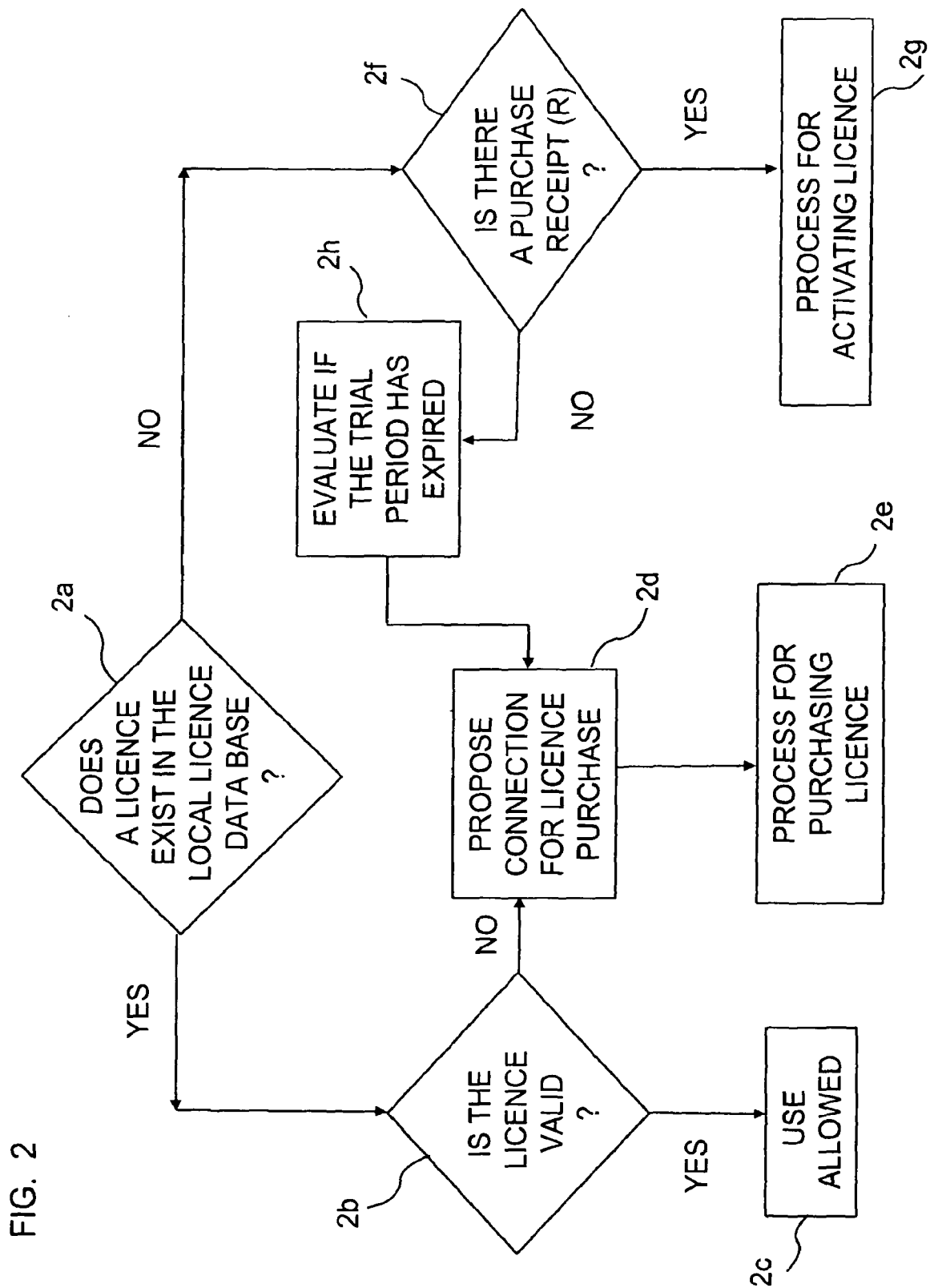
FIG. 2 is a flow chart of implementing a software component, according to an embodiment of the invention.

When the program SOFT is executed in the computer 40, component COMP is executed performing the actions shown in FIG. 2. First, 2a verifies if in the local license database 41 there is a use license for the program SOFT. If the license exists, 2b verifies if it is valid. If it is valid, 2c authorizes the use of the program. If it is not valid, 2d proposes a connection with the vendor site 20 to purchase a license. The component COMP locally accesses the identifying data IDV of the vendor site 20, which for example includes the URL address of the vendor site, by one of the processes 201, 202 or 203 explained above. If the user agrees, 2e launches the process for purchasing a license described below and shown in FIG. 3. If, at 2a, the license does not exist, 2f verifies if the purchase receipt R exists, which is accessed locally by one of the processes 301 or 303 explained above. If the purchase receipt R exists, 2g launches the process for obtaining and activating the license described below and shown in FIG. 4. If the purchase receipt R does not exist, 2h evaluates if a demonstration period for the program SOFT has expired. If the demonstration period has expired, 2d proposes a connection with the vendor site 20 to purchase a license, as described in the foregoing.

Figure 3:
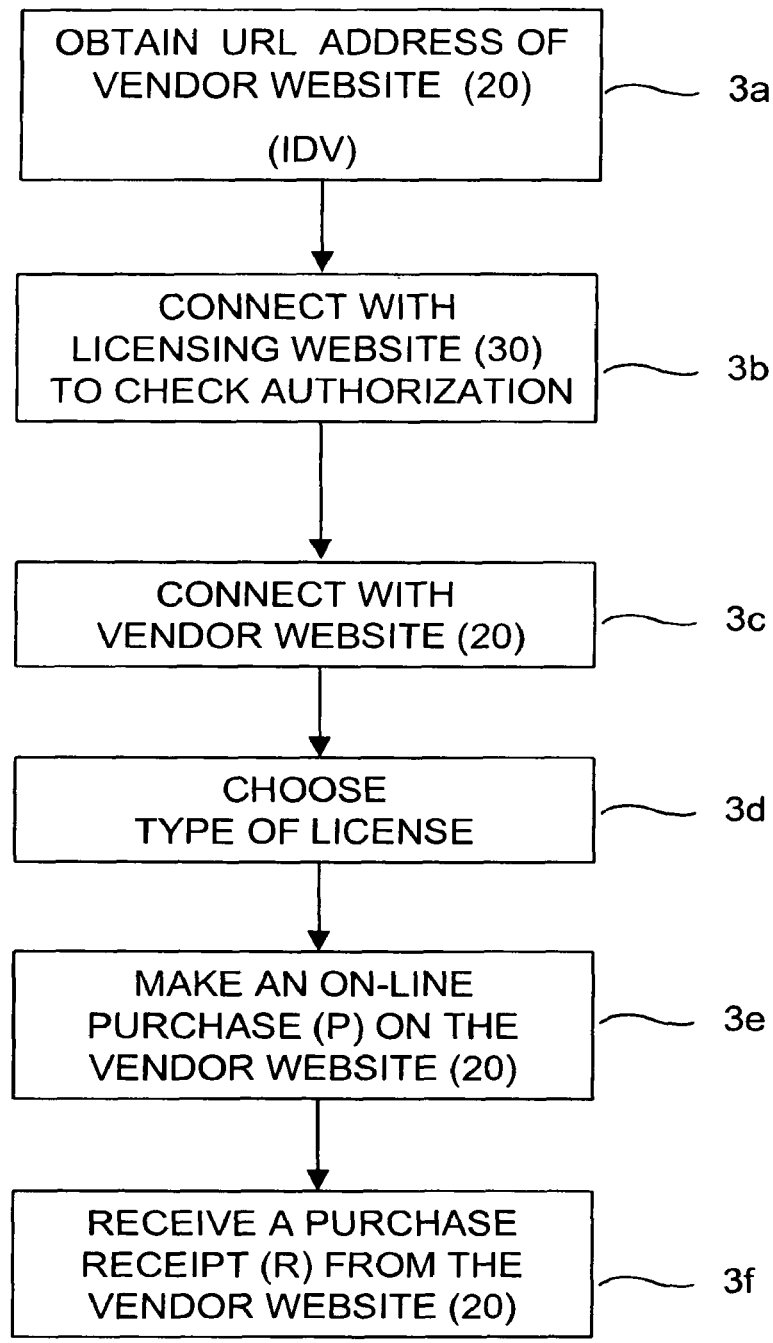
FIG. 3 is a flow chart of purchasing a use license, implemented by the software component, according to an embodiment of the invention.

The process for purchasing a use license according to an embodiment of the invention is shown schematically in FIG. 3. In this process, the component COMP carries out the following basic actions. First, 3a locally accesses the data IDV to obtain, for example, the URL of the vendor site 20, by one of the processes 201, 202 or 203 explained above. Then, 3b sets up a communication 304 (902, 801 as the case may be) with the licensing site 30 and transmits the data IDV to the licensing site 30. The licensing site 30 checks that the vendor site 20 corresponding to the data IDV is authorized to sell the use license or authenticates the vendor site identifiers provided by the component (COMP) and, if it is authorized, returns a purchase authorization to the component COMP, after which 3c the component COMP sets up a communication 302 with the vendor site 20 and notifies the vendor site 20 that the component COMP wishes to initiate a process for purchasing a license. During this communication 302, the user can intervene through the graphical interface of the component COMP and choose the type of license most suited to the purchaser. Then, 3d chooses the type of license the component COMP wishes to purchase and 3e makes a purchase by an on-line payment P, in exchange receiving at 3f the purchase receipt R. In this example, the component COMP itself sets up the communication 302 with the vendor site 20. As an alternative, it can be provided that the component COMP shows in the graphical user interface a link to the URL address of the vendor site 20 and allows the user to set up the communication 302 through the browser of the purchaser's computer 40. Optionally, instead of setting up direct communication 302 with the vendor site 20, the component COMP can do this by indirect communication 902 with the supervising site 50 in communication with the vendor site 20 via the setup communication 802.

Figure 4:
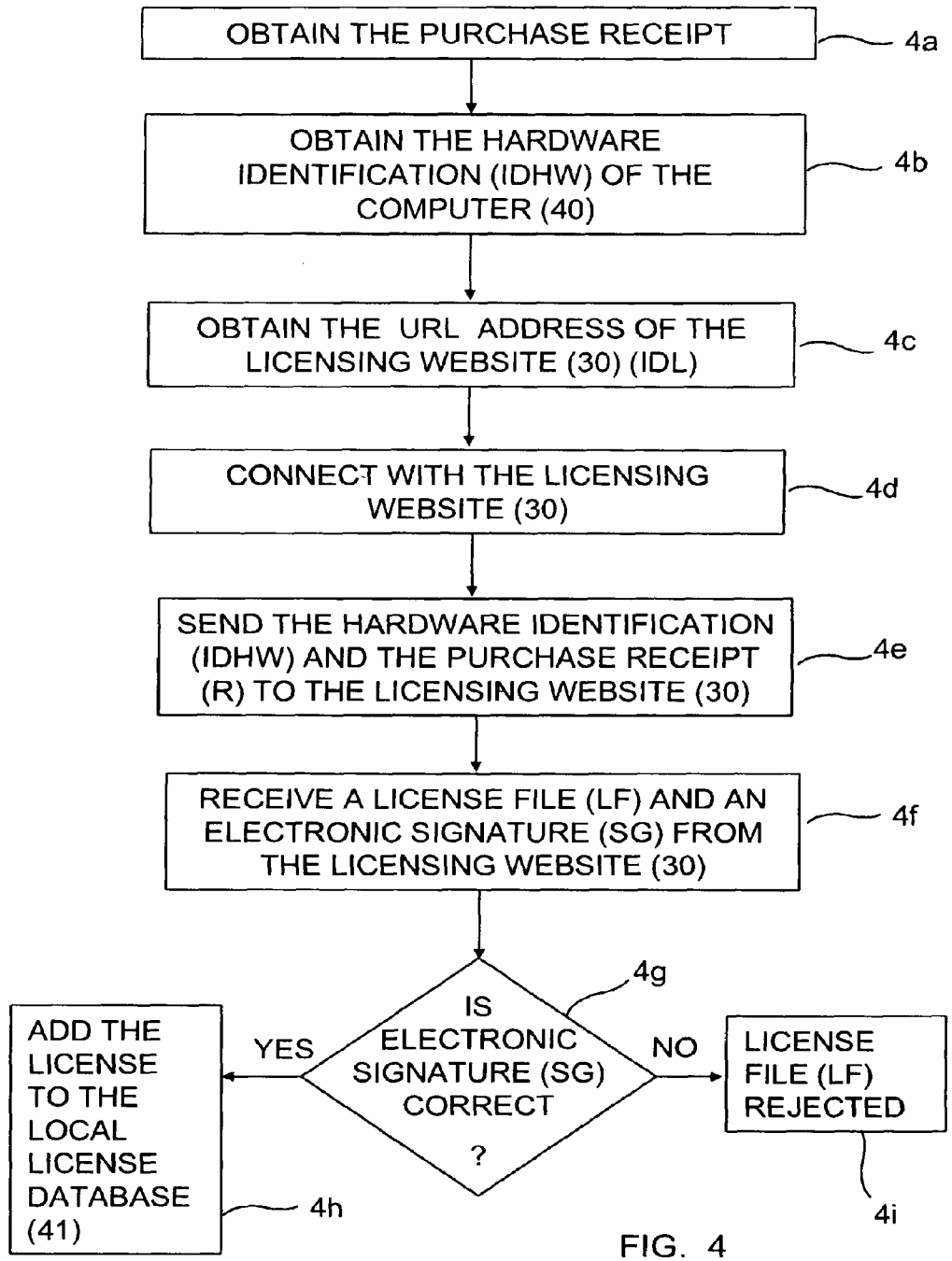
FIG. 4 is a flow chart of purchasing and activating a use license, implemented by the software component, according to an embodiment of the invention.

The process for obtaining and activating the license according to an embodiment of the invention is schematically shown in FIG. 4. In this process, the component COMP carries out the following basic actions. First, 4a obtains the purchase receipt R, which is accessed locally by one of the processes 301 or 303 explained above. The component COMP also locally access 4b hardware identifying data IDHW in the computer 40. These data IDHW are, for example, the serial number of the hard drive where the program SOFT is installed, which is read by the component COMP by the process 501 indicated in FIG. 1. The component COMP also obtains the identifying data of the licensing site IDL, for example, the URL address of the licensing site, reading the IDL by the process 401 indicated in FIG. 1. According to an aspect of the embodiments, the data IDL is incorporated in the component COMP itself. Then, 4d sets up a communication 601 with the licensing site 30 and notifies the licensing site that the component COMP wishes to initiate a license activation session. In the communication 601, the component COMP at 4e sends the hardware identifying data IDHW and the purchase receipt R and in exchange receives at 4f a license file LF including the hardware identifying data IDHW, such that the license file LF will only be valid for the use of the program SOFT in said computer 40, and an electronic signature SG done with the private key owned by the licensing site 30. The component COMP owns the electronic signature public key and verifies at 4g such signature. If the electronic signature SG is correct, at 4h the component COMP adds the license file LF to the license database 41, where the component COMP stores the information of the different processes for purchasing and activating licenses in which it has been involved. If the electronic signature SG is not correct, at 4i the license file LF is rejected.

Optionally, instead of setting up direct communication 601 with the licensing site 30, the component COMP may do so by indirect communication 902 with the supervising site 50, which in turn sets up communications 801, 802 with the licensing site 30 and with the vendor site 20, which can also communicate with one another. All this is possible due to the fact that the component COMP knows the identifying data of the supervising site, for example, a URL address of the supervising site 50, and is able to provide the identifying data of the vendor and licensing sites, for example, the URL addresses of the licensing site 30 and of the vendor site 20, contained respectively in the data IDL and IDV which the component COMP accesses locally.

It can also optionally be provided to set up on-line communication 701 between the vendor site 20 and the licensing site 30, during which they exchange information relating to the acquisition of the software product SOFT. For example, this on-line communication 701 allows the licensing site 30 to know that the software product SOFT has been downloaded and/or paid for from a specific and authorized vendor site 20 before the purchaser, through the software component COMP, makes contact with said licensing site 30 to activate a use license. When a use license of software product SOFT has been purchased in an authorized vendor site 20, in said on-line communication 701 the vendor site 20 sends a copy of the purchase receipt R to the licensing site 30.

The embodiments have been described with respect to a process, including an apparatus and computer readable medium thereof, of on-line sale of a software product use license, by:

offering online, by a plurality of vendor sites, a software product to be downloaded on-line according to respective online downloading processes;

selling, or offering for purchase online, a use license for said software product offered by one of said vendor sites and downloaded on-line; and activating said purchased use license on-line by a licensing site different from said vendor sites.

The embodiments also comprise a software component as a use license activator for carrying out said process, including an apparatus and a computer readable medium thereof, by incorporating the software component with the software product; executing by an equipment said software component together with said software product for managing the activating a purchased use license for said software product by the licensing site; and associating a vendor site identifier to each of said on-line downloading processes of the software product by the vendor sites, wherein the executing software component locally accesses said vendor site identifier, locally accesses identifying data of the licensing site, and launches a process for managing the activating said purchased use license for the software product based upon the vendor site identifier and the identifying data of the licensing site. According to an aspect of the embodiments, the IDV and IDL can be any identifying information uniquely identifying a vendor site 20 and a licensing web site 30, respectively, and can be generated or provided by the vendor site 20, the licensing web site 30, the software product (SOFT) 12, the component (COMP) 14, or any combinations thereof.

The described examples of preferred embodiments can be implemented in software (as stored or encoded on any known computer readable media, such as, without limitation, a compact disk, a Digital Versatile Disc (DVD), memory, a carrier wave or electro-magnetic signal, etc.) and/or in any computing or information processing hardware, for example, a programmable computing device. For example, the embodiments can be implemented in a programmable electronic device that can store, retrieve, output (for example, display) and process data). For example, the embodiments can be implemented in any type of programmable computing apparatus, such as (without limitation) a personal computer, a personal digital assistant (PDA), a server and/or a client computer in case of a client-server network architecture, or networked computers in a distributed network architecture.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method comprising:
   a. a supervising site transmitting a software module to a licensing site associated with a software company;
   b. the supervising site receiving from the licensing site a software product comprising the software module;
   c. the supervising site transmitting the software product comprising the software module to a vendor site;
   d. the vendor site transmitting the software product to a programmable computing device;
   e. the programmable computing device determining, by executing instructions of the software module stored in the programmable computing device, that a software product license is not stored in the programmable computing device;
   f. in response to determining that the software product license is not stored in the programmable computing device, the programmable computing device determining, by executing instructions of the software module that a license purchase receipt for the software product is not stored in the programmable computing device;
   g. in response to determining that the software product license and the license purchase receipt for the software product are not stored in the programmable computing device, the programmable computing device executing instructions of the software module to create a graphical interface at the programmable computing device, the graphical interface displaying one or more purchase options for the software product;
   h. the programmable computing device locally accessing identification data of the vendor site and setting up a communication with the vendor site, using the locally accessed identification data of the vendor site, by executing instructions of the software module;
   i. the programmable computing device executing instructions of the software module for purchasing online a license for the software product from the vendor site;
   j. in response to receiving a license purchase request from the programmable computing device, the vendor site transmitting to the programmable computing device the license purchase receipt;
   k. the licensing site receiving from the programmable computing device the license purchase receipt transmitted from the vendor site;
   l. the licensing site receiving from the programmable computing device an identifier associated with the programmable computing device; and
   m. in response to receiving said license purchase receipt and said identifier, the licensing site transmitting to the programmable computing device the software product license, the software product license is bound to the identifier of the programmable computing device.

2. The method of claim 1, further comprising the vendor site communicating with the licensing site to verify the license purchase receipt for the software product.

3. The method of claim 2, further comprising the vendor site transmitting to the licensing site the license purchase receipt for the software product.

4. The method of claim 1, further comprising the vendor site paying the software company a part of the payment received for the sale of the software product license.

5. The method of claim 1, further comprising the programmable computing device transmitting to the licensing site data identifying the vendor site.

6. The method of claim 1, wherein the software product stored in the programmable computing device comprises identifying data of the vendor site.

7. The method of claim 1, wherein the software product stored in the programmable computing device comprises identifying data of the licensing site.

8. The method of claim 1, wherein the graphical interface displays a purchase option to use the software product, or upgrades thereof.

9. The method of claim 8, wherein the graphical interface displays a purchase option to use the software product, or upgrades thereof, with the use being for a definite period of time.

10. The method of claim 1, wherein the software module comprises one or more of a class, a set of classes, a set of functions, a dynamic link library or source code.

11. The method of claim 1, wherein the software module incorporated in the software product comprises a set of instructions which can be loaded in the memory of the programmable computing device to be executed together with the software product and provide specific functions.

* * * * *